(12) United States Patent
Jariwala et al.

(45) Date of Patent: *Aug. 19, 2025
(10) Patent No.: US 12,391,566 B2

(54) LITHIUM EXTRACTION IMPROVEMENTS

(71) Applicant: Schlumberger Technology Corporation, Sugar Land, TX (US)

(72) Inventors: Ankur D. Jariwala, Katy, TX (US); Gary W. Sams, Spring, TX (US)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 817 days.

This patent is subject to a terminal disclaimer.

(21) Appl. No.: 17/444,072

(22) Filed: Jul. 30, 2021

(65) Prior Publication Data

US 2022/0055910 A1 Feb. 24, 2022

Related U.S. Application Data (60) Provisional application No. 63/068,394, filed on Aug. 21, 2020.

(51) Int. Cl.
| | |
|---|---|
| *C01D 15/08* | (2006.01) |
| *B01D 15/18* | (2006.01) |
| *B01D 15/42* | (2006.01) |
| *C01D 15/02* | (2006.01) |

(52) U.S. Cl.
CPC ......... *C01D 15/08* (2013.01); *B01D 15/1871* (2013.01); *B01D 15/426* (2013.01); *C01D 15/02* (2013.01); *C01P 2006/80* (2013.01)

(58) Field of Classification Search
None
See application file for complete search history.

(56) References Cited

U.S. PATENT DOCUMENTS

| | | |
|---|---|---|
| 3,306,700 A | 2/1967 | Neipert et al. |
| 4,291,001 A | 9/1981 | Repsher et al. |
| 4,727,936 A | 3/1988 | Mioduszewski |
| 5,833,844 A | 11/1998 | Leavitt |

(Continued)

FOREIGN PATENT DOCUMENTS

| | | |
|---|---|---|
| AU | 2021254665 A1 | 12/2021 |
| CN | 1511964 A | 7/2004 |

(Continued)

OTHER PUBLICATIONS

RU 2688593 C1; Machine-generated English translation is attached (Year: 2019).*

(Continued)

*Primary Examiner* — Yun Qian
(74) *Attorney, Agent, or Firm* — Jeffrey D. Frantz (57) ABSTRACT

A method of recovering lithium from an aqueous source is described. Lithium is extracted from the aqueous source using a sorption/desorption process to form a lithium extract. Impurities are removed from the lithium extract to form a purified lithium extract, and the purified lithium extract is concentrated using a water removal process to form a lithium concentrate. The lithium concentrate is then converted to one or more of lithium carbonate and lithium hydroxide to form a converted stream. Various streams, including some lithium-containing streams, are recycled to the sorption/desorption process.

12 Claims, 3 Drawing Sheets

(56) References Cited

U.S. PATENT DOCUMENTS

| | | | |
|---|---|---|---|
| 6,073,448 | A | 6/2000 | Lozada |
| 9,068,247 | B2 | 6/2015 | Marston et al. |
| 9,976,417 | B2 | 5/2018 | Mahavadi et al. |
| 10,018,590 | B2 | 7/2018 | Mahavadi et al. |
| 11,169,114 | B2 | 11/2021 | Mahavadi |
| 11,298,658 | B2 | 4/2022 | Wohlert |
| 11,365,128 | B2 | 6/2022 | Marston et al. |
| 11,941,128 | B2 | 3/2024 | Andersen |
| 2003/0132113 | A1 | 7/2003 | Sarme et al. |
| 2006/0163069 | A1 | 7/2006 | Prak et al. |
| 2009/0269767 | A1 | 10/2009 | Soderlund et al. |
| 2010/0068605 | A1 | 3/2010 | Harris |
| 2011/0174739 | A1 | 7/2011 | Chung et al. |
| 2013/0205778 | A1 | 8/2013 | Hansen |
| 2014/0048485 | A1 | 2/2014 | Jacobs |
| 2014/0076734 | A1 | 3/2014 | Calvo |
| 2014/0239224 | A1 | 8/2014 | Burba |
| 2015/0114837 | A1 | 4/2015 | Mahavadi |
| 2015/0197830 | A1 | 7/2015 | Chon |
| 2017/0045476 | A1 | 2/2017 | Mahavadi et al. |
| 2017/0102370 | A1 | 4/2017 | Alber |
| 2018/0016153 | A1 | 1/2018 | Sharma |
| 2018/0147532 | A1 | 5/2018 | Switzer |
| 2018/0245180 | A1 * | 8/2018 | Cheng ............... B01J 20/28004 |
| 2019/0120791 | A1 | 4/2019 | Al-Gouhi |
| 2019/0226336 | A1 | 7/2019 | Benson |
| 2019/0248667 | A1 | 8/2019 | Featherstone et al. |
| 2019/0256368 | A1 | 8/2019 | Marston et al. |
| 2020/0047124 | A1 | 2/2020 | Bhave |
| 2020/0086271 | A1 | 3/2020 | Harrison |
| 2020/0189924 | A1 | 6/2020 | Featherstone et al. |
| 2020/0283921 | A1 | 9/2020 | Mislan |
| 2020/0299805 | A1 | 9/2020 | Mceachern |
| 2020/0316557 | A1 | 10/2020 | Boualleg |
| 2020/0399772 | A1 | 12/2020 | Kiggins |
| 2021/0079497 | A1 | 3/2021 | Baxter et al. |
| 2021/0086400 | A1 | 3/2021 | Andersen |
| 2021/0087697 | A1 | 3/2021 | Riabtsev et al. |
| 2021/0246529 | A1 | 8/2021 | Jariwala et al. |
| 2023/0032153 | A1 | 2/2023 | Sams et al. |
| 2023/0086861 | A1 | 3/2023 | Perroni et al. |
| 2023/0088458 | A1 | 3/2023 | Sams et al. |

FOREIGN PATENT DOCUMENTS

| | | | |
|---|---|---|---|
| CN | 104313348 A | 1/2015 | |
| JP | 2011032151 A | 2/2011 | |
| JP | 2018172775 A | 11/2018 | |
| RU | 2688593 C1 * | 5/2019 | ............. C01D 15/00 |
| WO | 06103312 A1 | 10/2006 | |
| WO | 2012044163 A1 | 4/2012 | |
| WO | 2018081506 A1 | 5/2018 | |
| WO | 2018183555 A1 | 10/2018 | |
| WO | 2018190754 A2 | 10/2018 | |
| WO | 2019221932 A1 | 11/2019 | |
| WO | 2021061343 A1 | 4/2021 | |
| WO | 2021160240 A1 | 8/2021 | |
| WO | 2022040630 A1 | 2/2022 | |
| WO | 2022203706 A1 | 9/2022 | |
| WO | 2023009887 A1 | 2/2023 | |
| WO | 2023009888 A1 | 2/2023 | |
| WO | 2023022627 A1 | 2/2023 | |
| WO | 2023177994 A1 | 9/2023 | |
| WO | 2023183546 A1 | 9/2023 | |

OTHER PUBLICATIONS

International Search Report and Written Opinion issued in the PCT Application No. PCT/US2021/047156 dated Nov. 25, 2021, 11 pages.

Refrigeration, https://energyrecovery.com/refrigeration/, downloaded on Aug. 14, 2021 (5 pages).

Ferrara et al., (2015) A Small Power recovery expander for heat pump COP improvement, Energy Procedia 81 (015) 1151-1159.

Turbomachine expander offers efficient, safe strategy for heating, cooling, https://www.purdue.edu/newsroom/releases/2020/Q1/turbomachine-expander-offers-efficient,-safe-strategy-for-heating,-cooling.html, downloaded on Aug. 15, 2021 (5 pages).

Turkia, et al., Online Capillary Electophoresis for Monitoring Carboxylic Acid Production by Yeast during Bioreactor Cultivations, Anal. Chem. 2013, 85, 9705-97.

Xu, W. et al., "A Comprehensive Membrane Process for Preparing Lithium Carbonate from High Mg/Li Brine", Membranes, 2020, 10, 14 pages.

Kumar, A. et al., "Metals Recovery from Seawater Desalination Brines: Technologies, Opportunities and Challenges", ACS Sustainable Chemistry & Engineering 2021, 9, 7704-7712.

Zhao, X. et al., "Review on the electrochemical extraction of lithium from seawater/brine", Journal of Electroanalytical Chemistry 2019, 850, 113389, 13 pages.

Yang, S. et al., "Lithium Mteal Extraction from Seawater", Joule, 2018, 2, pp. 1648-1651.

Liu, C. et al., "Lithium Extraction from Seawater through Pulsed Electrochemical Intercalation", Joule 2020, 4, pp. 1459-1469.

Li, Z. et al., "Continuous electrical pumping membrane process for seawater lithium mining", Energy & Environmental Science 2021, 14, pp. 3152-3159.

International Search Report and Written Opinion issued in the PCT Application No. PCT/US2023/020788 dated Jul. 28, 2023, 12 pages.

International Search Report and Written Opinion issued in the PCT Application No. PCT/US2023/020954 dated Jul. 10, 2023, 12 pages.

International Search Report and Written Opinion issued in the PCT Application No. PCT/US2023/020957 dated Jul. 10, 2023, 12 pages.

International Search Report and Written Opinion issued in the PCT Application No. PCT/US2022/051500 dated May 2, 2023, 12 pages.

Watercycle Technologies, "Technology", 2022, accessed Sep. 19, 2024, https://www.watercycletechnologies.com/technology, 6 pages.

KMX Technologies, "Technology", 2024, accessed Sep. 19, 2024, https://kmxtechnologies.com/kmx-technology/, 9 pages.

* cited by examiner

LITHIUM EXTRACTION IMPROVEMENTS

CROSS-REFERENCE TO RELATED APPLICATIONS

This application claims the benefit of U.S. Provisional Application No. 63/068,394, filed Aug. 21, 2020, which is incorporated by reference in its entirety.

FIELD

This patent application describes methods and apparatus for lithium recovery from aqueous sources. Specifically, processes for absorbing lithium from brine sources are described herein.

BACKGROUND

Lithium is a key element in energy storage. Electrical storage devices, such as batteries, supercapacitors, and other devices commonly use lithium to mediate the storage and release of chemical potential energy as electrical current. As demand for renewable, but non-transportable, energy sources such as solar and wind energy grows, demand for technologies to store energy generated using such sources also grows.

According to the United States Geological Survey, global reserves of lithium total 21 million tons (metric) of lithium content, with Chile, Australia, Argentina, and China accounting for about 82% of global reserves. U.S. Geological Survey, Mineral Commodity Summaries, January 2021. Global production of lithium content was 82 kT in 2020 and 86 kT in 2019. Global consumption was estimated at 56 kT in both 2019 and 2020. Id. By one estimate, global lithium demand is expected to reach 1.79 MTa of lithium carbonate equivalent, which is approximately 339 kTa of lithium content, by 2030 for an average annual growth in demand of approximately 22%. Supply is currently forecast to run behind demand, with lithium prices expected to triple by 2025, by some estimates. The incentive for more lithium production could not be clearer.

The mining industry has numerous techniques for the extraction of lithium from mineral or saline waters. Hard rock mining with acid digestion is common, but labor intensive. Methods currently used for salar lakes involve evaporation ponds with chemical additives to selectively precipitate the lithium. This process requires months to complete, recovering roughly 50-60% of the original lithium.

In recent years, companies are investigating improved methods to recover lithium directly from salar lakes and other brine sources that avoid evaporation, are faster and have high lithium yield. Many techniques use adsorbents that selectively recover lithium, followed by a wash step that liberates the lithium for further processing. Solid and liquid adsorbents are used. These adsorbents can be very sensitive to impurities such as divalent ions, silica, and metals.

The methods above are generally difficult to scale, are expensive to operate, and are generally not efficient and environmentally benign in use of water. New apparatus and methods of lithium extraction are needed.

SUMMARY

Embodiments described herein provide a method of recovering lithium from an aqueous source, comprising extracting lithium from the aqueous source using an sorption/desorption process to form a lithium extract; concentrating the purified lithium extract using a water removal process to form a lithium concentrate and a concentration water stream; converting lithium in the lithium concentrate to one or more of lithium carbonate and lithium hydroxide to form a product stream and one or more conversion water streams; and recycling at least a portion of one or more of the purified lithium extract, the lithium concentrate, the concentration water stream, or the one or more conversion water streams to the sorption/desorption process.

Other embodiments described herein provide a method of recovering lithium from an aqueous source, comprising extracting lithium from the aqueous source using a first sorption/desorption process to form a lithium extract; removing impurities from the lithium extract to form a purified lithium extract; concentrating the purified lithium extract using a second sorption/desorption process to form an intermediate lithium concentrate; concentrating the intermediate lithium concentrate using a water removal process to form a lithium concentrate and a first water stream; converting lithium in the lithium concentrate to one or more of lithium carbonate and lithium hydroxide to form a product stream and one or more second water streams; and recycling at least a portion of one or more of the lithium concentrate, the first water stream, the one or more second water streams, or the purified lithium extract to the second sorption/desorption process.

Other embodiments described herein provide a method of recovering lithium from an aqueous source, the method including extracting lithium from the aqueous source using a first sorption/desorption process to form a lithium extract; removing impurities from the lithium extract to form a purified lithium extract; concentrating the purified lithium extract using a second sorption/desorption process to form an intermediate lithium concentrate; concentrating the intermediate lithium concentrate using a membrane separation process to form a lithium concentrate and a permeate stream; converting lithium in the lithium concentrate to one or more of lithium carbonate and lithium hydroxide to form a product stream and one or more water streams; recovering waste heat from converting the lithium in the lithium concentrate; and recycling at least a portion of one or more of the lithium concentrate, the permeate stream, the water streams, or the purified lithium extract to the second sorption/desorption process.

DETAILED DESCRIPTION

Lithium can be extracted from aqueous sources such as salar lakes, surface brines, seawater, petro-lithium brine, mining brines (for example from lithium-containing shale or mica, or from spodumene), geothermal brines, battery recycling effluent, and other aqueous lithium sources. Lithium minerals, such as lithium-bearing clays like hectorite, can also be dispersed in water for processing lithium extraction processes. The lithium extraction processes described herein can be used to extract lithium from such sources.

Figure 1:
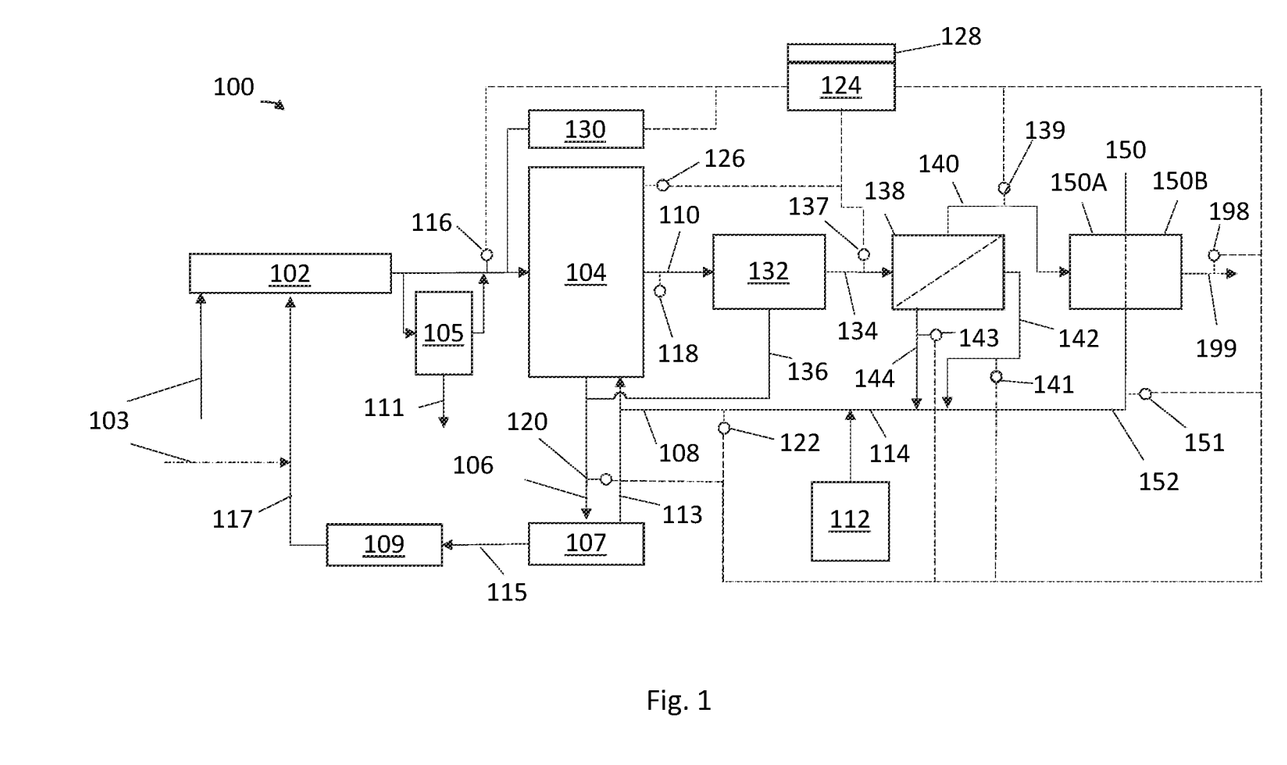
FIG. 1 is a process diagram of a lithium recovery process according to one embodiment.

FIG. 1 is a process diagram summarizing a lithium recovery process 100 according to one embodiment. The lithium recovery process 100 generally uses an sorption/desorption process to extract lithium from a brine along with a membrane concentration process to increase solution concentration of lithium for downstream conversions to lithium carbonate and/or lithium hydroxide hydrate. The sorption portion of the process can be absorption or adsorption, or a mixture thereof, depending on the medium used to accomplish the sorption.

Lithium-containing brine from a brine source 102 is brought to the inlet of a lithium extractor 104. The lithium extractor 104 is a sorption unit, with an sorption medium that selectively absorbs lithium. In the lithium extractor 104, a resin is disposed within a vessel to provide exposure of the resin to a lithium-containing brine. The resin may be stationary or fluidized within the vessel, or the resin may be conveyed through one or more vessels or zones for contacting with the brine, for example in a counter-current format. The resin adsorbs lithium from the brine source 102 leaving a lithium-depleted brine 106, which exits the lithium extractor 104. Adsorption may be encouraged by heating the brine source 102 to a brine source temperature of 70° F. to 90° F., where the brine source 102 has a natural temperature that is below that range. Water may be separated from the lithium-depleted brine 106 using a water recovery process 107, which can be a filtration or membrane process. The water recovery process recovers a water stream 113 from the lithium-depleted brine 106, yielding an impurity stream 115. The water stream 113 is re-used in the lithium extractor 104, as further described below, and the impurity stream 115 is routed to a purification process 109, which can be any suitable purification process such as a rapid infiltration process, or other filtration or membrane process, or combination of processes, before a clean brine 117 is returned to the environment.

Lithium recovery processing can be enhanced by lowering pH in the brine source 102. A lithium-selective additive sweep 103 can be applied directly to the brine source 102 to preferentially encourage lithium to migrate toward the feed of the lithium extractor 104. For example, where the brine source contains lithium chloride, a sweep 103 of hydrochloric acid (HCl) can be injected in the brine source 102 at a location remote from the feed to the lithium extractor 104 to enhance lithium recovery processing. Applying an acid sweep such that pH of the feed to the lithium extractor 104 is from 5.5 to 7.0, for example about 6.0, can, for example, mobilize lithium from mineral deposits in and around the brine source. Low pH in the brine source 102 can be remediated after exhaustion of the lithium, if desired, by adding a suitable basic compound, such as sodium or potassium hydroxide to raise pH to its original value. In one alternate method, the lithium-selective additive sweep 103 can be added to brine returned to the brine source 102 from the lithium recovery process 100, so the returned brine can be used as a vehicle to deliver the sweep 103. Other materials that can be used as lithium-selective additive sweep include lithium-selective absorbents, polymers, dissolved gases, liquid ion-exchange fluids, and other materials. Selection of such materials depend on geometry and composition of the brine source 102 and location of brine withdrawal from, and injection into, the brine source 102.

An optional pretreat process may be performed on the brine from the brine source 102 to reduce impurities that might impact performance of the lithium extractor 104. For example, a compatible reagent can be added to the brine source in a pretreat unit 105 to reduce impurities such as iron and other metals prior to exposing the lithium extractor 104 to the brine. The impurities can be removed as an impurity stream 111. Such treatments can be helpful where impurity levels are too high to treat directly at the brine source 102 but removal of at least some impurities would be helpful to initial extraction processing. In another version of a pretreat process, which can be combined with the pretreat process described above, an impurity absorber or filter, or both, can be used to absorb impurities that might affect performance of the lithium extractor 104. A medium selective to such impurities, such as an ion exchange medium or filtration medium, can preferentially remove impurities such as silica and divalent ions that can degrade lithium sorption of the absorbent of the lithium extractor 104.

In the lithium extractor 104, resin loaded with lithium is contacted with an eluent stream 108 that removes lithium from the loaded resin. A lithium extract stream 110 exits the lithium extractor 104. Most non-lithium ions in the original brine stream exit with the lithium-depleted brine, so the lithium extract stream 110 has, at most, low levels of impurities. The eluent stream 108 may be deionized water, or water with low levels of lithium or other ions. A water source 112, such as a deionized water source or a water purifier, may be used to provide water for the eluent stream 108. Here, a lithium-containing stream 114 is recycled from downstream operations to provide water for the eluent stream 108. The water stream 113 is also used to provide water for the eluent stream 108. Water can be added from the water source 112 where make-up water is needed to reach a target solution concentration in the lithium extract stream 110, or to lower solution concentration of ions, such as lithium or other ions, to a target level in the eluent stream 108. Using recycled streams for the eluent stream 108 reduces, and can eliminate, the need for fresh water makeup. Lithium desorption can be increased by heating the eluent stream to an eluent temperature of 100° F. to 140° F.

Composition-related sensors can be coupled to any of the incoming and outgoing streams of the lithium extractor 104 to provide data for controlling and optimizing the operation of the lithium extractor 104. The composition sensors may be any or all of pH sensors, conductivity sensors, permittivity sensors, specific gravity sensors, turbidity sensors, electrochemical sensors (e.g. ionophoric electrodes and membranes), chromatographs or other differential separation instruments, spectrometers (FTIR, NMR, flame ionization or emission, mass spectrometers, X-ray fluorescence, etc.) or other optical sensors, and the like. One or more sensors can be used for each, or any stream, and multiple sensors based on different technologies can be used to reduce measurement uncertainty for any stream. Temperature and pressure sensors can also be coupled to any desired stream.

Thus, one or more composition sensors 116 may be disposed at the brine source 102 or at the brine inlet to the lithium extractor 104, one or more lithium extract composition sensors 118 may be disposed in the lithium extract stream 110, one or more lithium-depleted stream sensors 120 may be disposed in the lithium-depleted brine 106, and one or more eluent sensors 122 may be disposed in the eluent stream 108. Each, or any, of the composition sensors 116, 118, 120, and 122 may also sense other conditions of each respective stream, such as temperature and pressure. Each of the sensors 116, 118, 120, and 122, if used, may be operatively coupled to a controller 124 configured to receive signals from each of the sensors 116, 118, 120, and 122 representing composition, and optionally other conditions, of the corresponding streams. Other sensors can optionally be used to sense other conditions of the respective streams, such as temperature and pressure, separately and provide signals representing those other conditions to the controller 124. The controller 124 can be configured to adjust process conditions of the lithium extractor 104 based on the signals from the sensors 116, 118, 120, and 122, and any other sensors that might be applied. For example, the controller 124 can adjust flow rate of the brine source 102, flow rate of the eluent stream 108, flow rate of water from the water source 112, and/or flow rate of the lithium-containing stream 114 based on the signals. The controller 124 can also be configured to monitor lithium uptake of the absorbent, for example based on lithium detected in the brine source 102 by the brine source sensor 116 and lithium detected in the lithium-depleted brine 106. The controller 124 can be configured to adjust resin loading time (i.e. time spent loading the resin with lithium), resin cycle time (resin loading time plus resin unloading time), brine residence time, eluent residence time, or other process parameters based on lithium uptake. Lithium unloading can also be similarly monitored, and process adjustments made by the controller 124.

Other sensors can be used with the lithium extractor 104. For example, imaging or "signature" sensors of various types, such as NMR and XRD sensors, can be used and operatively coupled to the controller. Thus, a signature sensor 126 can be coupled to the lithium extractor 104 to generate a signal representing the effect of the lithium extractor on an electric field, magnetic field, or propagating electromagnetic radiation. The signal can be thought of as a signature representative of process conditions. A simulator or machine learning system can be used to process the signals from any or all of the sensors 116, 118, 120, 122, and 126 and output process set points such as flow rates, temperatures, and the like. For example, an advisory system 128 may be operatively coupled to the controller 124 and to the sensors 116, 118, 120, 122, and 126 to compute process targets or ranges for implementation by the controller 124 or to output process recommendations to operators. The signature sensor 126, for example, may be able to highlight more esoteric process conditions such as channeling, plugging, or scaling in the resin and to signal an operator that such process conditions are occurring. The signature sensors typically inject some form of electromagnetic radiation into the lithium extractor 104 itself. The radiation interacts with the interior of the lithium extractor 104, and the resulting radiation "signature" is detected to derive information about the interior of the extractor.

Another example of a sensor system that can be used to track operation and performance of the lithium extractor 104 is a physical replica of the extractor. An absorber-analyzer 130 can be coupled to the brine source 102 to serve as a test unit to monitor for changing composition of the brine source 102. The absorber-analyzer 130 is a small sorption unit loaded with the same medium used to absorb lithium in the lithium extractor 104. The absorber-analyzer 130 can be monitored for changing performance to detect changing levels of impurities that can affect performance of the sorption medium in the lithium extractor 104. A slipstream of the brine source 102 can be routed to the absorber-analyzer 130, and sensors, such as pH sensors, conductivity sensors, temperature and pressure sensors, and composition sensors, can be applied to monitor changing conditions within the absorber-analyzer 130 to predict changing conditions of the lithium extractor 104. The sensors, which can include any or all of the sensors mentioned above, can be operatively coupled to the controller 124. The controller 124 can monitor the sensors of the absorber-analyzer 130 and apply predictive methods, such as simulators and machine learning systems, to control the lithium extractor 104 based on the readings from the absorber-analyzer sensors. The sensors coupled to the lithium extractor 104 can also be used. For example, the sensors of the lithium extractor 104 and the absorber-analyzer 130 can be provided to the advisory system 128 to improve output accuracy of the advisory system 128.

Another sensor system that can be used to track operation and performance of the lithium extractor 104 is a tracer detector. An easily detectible species with behavior toward the absorbent medium of the lithium extractor 104 is injected into the feed to the extractor 104 as a tracer, and detection of the tracer is applied to one or more of the effluent streams 106 and 110 to monitor uptake of the tracer by the absorbent medium. The same tracer detector system can be applied to the absorber-analyzer, if desired. It should be noted that additional sample streams can be obtained from the lithium extractor 104 and/or the absorber-analyzer 130 to monitor conditions of the absorbent medium at intermediate locations between feed and effluent. The tracer detector system can provide analysis of changing conditions throughout the lithium extractor 104 during processing to control the extractor and diagnose intervention situations.

The advisory system 128 is a digital processing system that generally takes input data from the controller 124, and potentially directly from the sensors 116, 118, 120, 122, and 126, and the absorber-analyzer 130, and provides output to the controller 124. The output may be set points of various instruments of the process 100 or parameter targets that the controller 124 translates into set points for the instruments. The advisory system 128 may be co-located with the controller 124, or may be remote from the controller 124. The advisory system 128 may have direct data linkage to the controller 124, or may communicate with the controller 124 via a digital network. The advisory system 128 may be coupled to controllers of multiple lithium recovery processes like the process 100 to increase data available for the models used by the advisory system 128. In such cases, other digital processing systems, such as data aggregators, disaggregators, routers, and the like, may mediate communication between the advisory system 128 and the controllers 124. The advisory system 128 may also support user reporting.

The lithium extract stream 110 can have a solution concentration of lithium limited only by solubility of the extracted lithium salt. Flow rate of the eluent stream 108 can be controlled to maximize solution concentration of lithium in the extract stream 110. The lithium extractor 104 can boost lithium solution concentration, in some cases, by a factor of 20 or more. That is to say, a ratio of lithium solution concentration in the lithium extract stream 110 to lithium solution concentration in the brine source 102 can be a factor of 20 or more. Depending on concentration of the brine source 102, the ratio can be almost arbitrarily large. Dilute brine sources will take time to load the absorbent medium in the extractor 104, but once loaded, the lithium can be unloaded at near the solubility limit in the extract stream 110. For example, a brine source containing 10 ppm lithium could be processed using the lithium extractor 104 to yield a lithium extract stream 110 having 40,000 ppm lithium, for a concentration gain ratio of 4,000.

The lithium extract stream 110 is routed to an impurity removal unit 132, which can be a filtration unit, ion exchange unit, membrane unit, flocculation unit, precipitation unit, electrochemical coagulation unit, density separation unit, or other chemical or physical treatment unit for removing non-lithium impurities such as silica, other particulates, and divalent metal ions, which are known in the art. The impurity removal unit 132 produces a clean lithium extract stream 134, and may produce one or more impurity streams 136 that can be routed to the water recovery process 107, or to another advantageous use. Solution concentration of lithium in the clean lithium extract stream 134 may be the same as that of the lithium extract stream 110, or may be less if chemical additives are used to remove impurities. If downstream concentrators are used to recover lithium, minimizing dilution during impurity removal can minimize concentrator duty.

A composition sensor 137, optionally also including temperature and pressure sensors, can be coupled to the clean lithium extract stream 134, for example to monitor impurities that might pass through the impurity removal unit 132. Temperature and pressure of the clean lithium extract stream 134 can optionally be sensed separately. The composition sensor 137, and any other sensors optionally coupled to the clean lithium extract stream 134, can be operatively connected to the controller 124, which can be configured to control operation of the impurity removal unit 132 based on signals from the composition sensor 137 to target or minimize level of one or more impurities, such as divalent ions.

The clean lithium extract stream 134 is routed to a concentrator 138. The concentrator 138 is a water removal process that produces a lithium concentrate stream 140 and a water stream 142. Here, the concentrator 138 is depicted as a membrane separator, but the concentrator 138 could also be an evaporator, such as a thermal evaporator, a force circulation evaporator (i.e. an evaporator that utilizes humidity of a gas), or a multi-effect evaporator, in some embodiments. The concentrator 138 may also produce a sweep effluent 144 that can be combined with other streams in a controlled fashion to target a salinity level in the eluent stream 108. The water removal process of the concentrator 138 may use multiple membrane separation units and/or multiple evaporators in series and/or parallel. For membrane separation, the lithium extract stream 134 is brought to a target pressure, for example using a pump of any convenient type. A portion, or all, of any of the effluent streams of the concentrator 138, including the lithium concentrate stream 140 and the water stream 142, can be recycled to the lithium extractor 104 as the lithium-containing stream 114, or a component thereof, to be used as part of the eluent stream 108. Salinity in the eluent stream 108 can be controlled by mixing various salt-containing streams, with varying salinities, to meet a target. The concentrator 138 increases lithium solution concentration by a factor of about 20, in some cases, by removing water from the clean lithium extract stream 134. The permeate stream 142 is a fresh water stream that is recycled to the lithium extractor 104 in the eluent 108.

The controller 124 can be further configured to operate the impurity removal unit 132 based on signals from the composition sensor 137 to intensify removal of impurities by adjusting temperature, pressure, or sweep to increase separation of impurities. Other effluent streams of the concentrator 138 can also have sensors operatively coupled to the controller 124. A lithium concentrate sensor 139 can be coupled to the lithium concentrate stream 140. A water sensor 141 can be coupled to the water stream 142. Where a sweep is used for a membrane process, a sweep sensor 143 can be coupled to the sweep effluent 144. Each of the sensors 139, 141, and 143 can optionally also include temperature and pressure sensors, or such sensors can be separately coupled to the respective streams. Each of the sensors 139, 141, and 143, if used, can be operatively coupled to the controller 124, which can be configured to adjust operation of the concentrator 138 based on signals from the sensors 139, 141, and 143, and to adjust recycle of streams to the lithium extractor 104 based on the composition signals and/or the condition (pressure, temperature, etc.) signals from the sensors. If lithium penetration occurs in the concentrator 138, the lithium can be recycled in the eluent 108 and recovered in the lithium extractor 104. If increased lithium concentration in the eluent 108 is detected due to lithium penetration in the lithium concentrator 138, the controller 124 can use more make-up water from the water source 112, or more or less of the recycled downstream streams from the concentrator 138 (e.g. the permeate stream 142) or the conversion process 150.

The lithium concentrate stream 140 is converted to a lithium hydroxide product 199, typically but not necessarily a lithium hydroxide monohydrate, in a conversion process 150. The conversion process 150 involves a first treatment 150A using sodium carbonate to convert lithium chloride to lithium carbonate followed by a second treatment 150B using calcium hydroxide to convert lithium carbonate to lithium hydroxide powder or hydrate paste. Either or both treatments may include evaporation, which encourages precipitation, but can also precipitate some impurities in the first treatment 150A. A wash step can be performed on the filtrate to remove impurities with little loss of lithium. The wash effluent can be returned to the brine source 102. In alternate methods, direct conversion to lithium hydroxide may be accomplished using electrochemical methods.

The evaporation can produce water streams 152 that can be used for recycling, for example to the eluent stream 108, potentially along with other streams that can be recycled to the lithium extractor 104 to target salinity concentration in the eluent stream 108. Where the water stream 142 of the concentrator 138 is a first water stream, one or more second water streams 152 are produced by the conversion process 150. Examples of other streams from the conversion process 150 that can be recycled include a portion of the lithium carbonate stream from the first treatment 150A and/or a portion of the lithium hydroxide from the second treatment 150B, which can be recycled, with or without other streams from the conversion process 150 or the concentrator 138, to the eluent stream 108. All the clean lithium-containing streams derived from the clean lithium extract stream 134 can be manifolded to the eluent stream 108, with flow controls operatively coupled to the controller 124, which can be configured to adjust flow rates of the various streams, along with make-up water from the water source 112, or water recovered in the water recovery process 107, to optimize composition of the eluent stream 108 for lithium unloading from the absorbent medium. As described above, composition of the various streams can be sensed, and signals routed to the controller 124 to determine an eluent stream composition for optimal unloading rate and lithium solution concentration. A water composition sensor (optionally including temperature and pressure) 151 can be coupled to the water streams 152 to monitor for impurities and/or salt or hydroxide content, and can be operatively coupled to the controller 124, which can be further configured to control recycle rate of the water stream 152 to target composition of the eluent stream 108 based, further, on signals from the water composition sensor 151. A product sensor 198 can be coupled to the lithium hydroxide product 199 to monitor for impurities, and can be operatively coupled to the controller 124, which can be further configured to control impurity removal at the brine source 102, the pretreat unit 105, or the impurity removal process 132 based on signals from the product sensor 198.

The need for evaporation in the conversion process 150 can be reduced by using membrane separation to remove some water prior to evaporation steps. For example, after converting the lithium to lithium hydroxide, the lithium hydroxide stream can be heated to 200° F.-210° F. to maximize solubility of lithium hydroxide. The heated lithium hydroxide stream can then be subjected to membrane separation to remove water as a permeate stream. The non-permeate stream, concentrated in lithium hydroxide, can then be cooled to encourage lithium hydroxide to precipitate, and the precipitated solid can be recovered and dried with reduced energy input.

The use of an impurity removal process following lithium extraction provides various lithium-containing water streams that can be used in the eluent stream 108 for lithium extraction. Use of such streams recycles those streams through the impurity removal process further cleaning the downstream process and routing the impurities, most of which come from the brine source 102, to the lithium-depleted brine 106 or back to the brine source 102. These recycle streams also help optimize the use of water, putting clean brine streams produced by the various processes downstream of the impurity removal process to use as carrier streams to reduce the use of fresh water.

Figure 2:
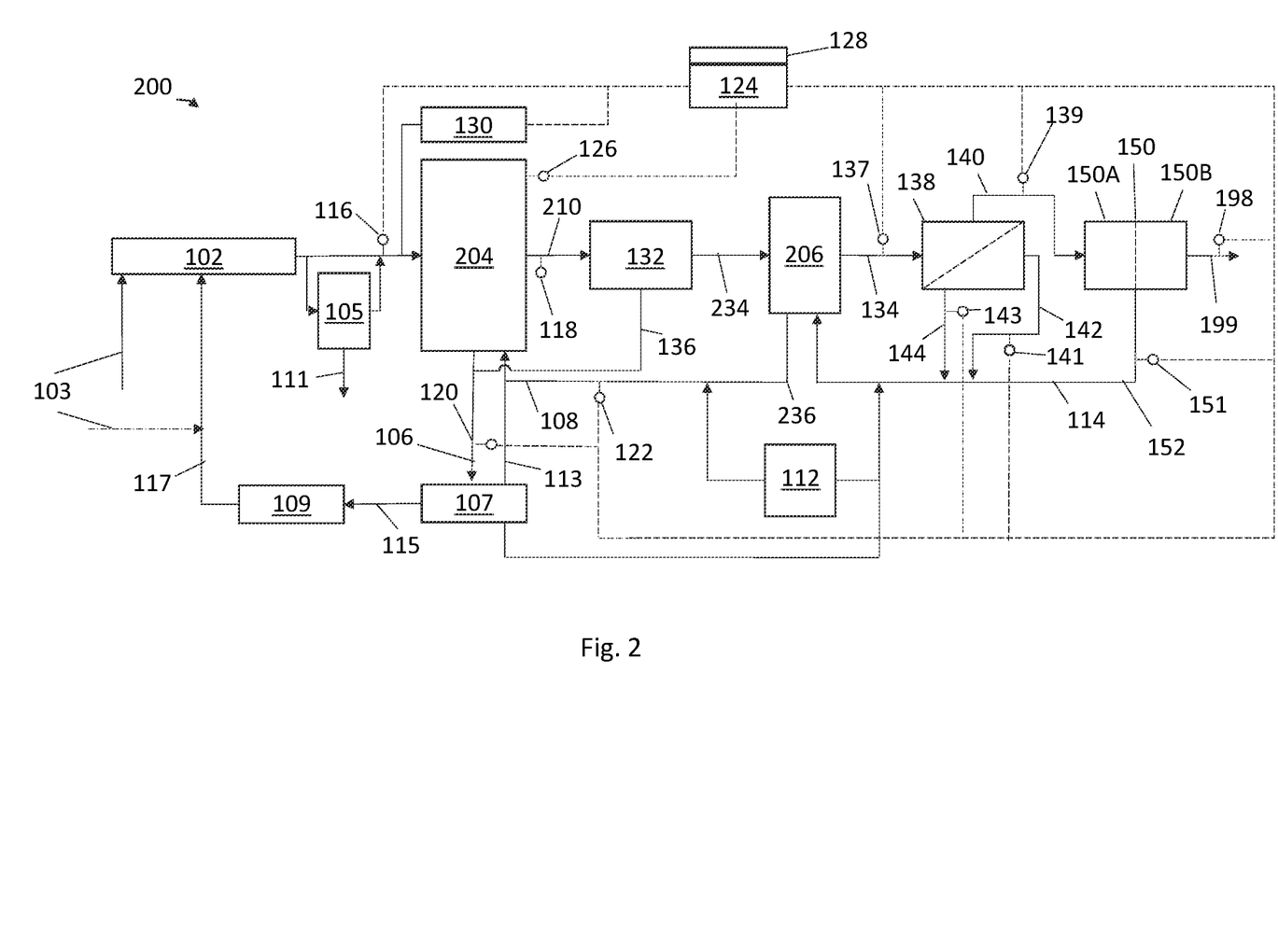
FIG. 2 is a process diagram of a lithium recovery process according to another embodiment.

FIG. 2 is a process diagram summarizing a lithium recovery process 200 according to another embodiment. The lithium recovery process 200 of FIG. 2 is similar to the lithium recovery process 100 of FIG. 1 in many respects, and elements of the process 200 that are the same as elements of the process 100 are labeled using the same numerals. In the process 200, two lithium extractors are used instead of one. Here, a first lithium extractor 204 performs a first lithium extraction process, substantially as described above but to an intermediate lithium concentration to form an intermediate lithium extract stream 210. The intermediate lithium extract stream 210 is routed to the impurity removal unit 132, which yields a clean intermediate lithium extract stream 234.

The stream 234 is routed to a second lithium extractor 206 for concentration to an arbitrary solution concentration of lithium, for example near the solubility limit of lithium chloride, to form the clean lithium extract stream 134. In this case, the lithium-depleted brine 106 is a first lithium-depleted brine 106, and the second lithium concentrator 206 produces a second lithium-depleted brine 236 that may be recycled to the first lithium extractor 204 for use in the eluent stream 108. As above, the first lithium extractor 204 may also use make-up water from the water source 112 for the eluent stream 108. The second lithium extractor 206 can also use make-up water from the water source 112 or the water recovery 107 as eluent, but also uses recycled water and lithium-containing streams from the downstream concentrator 138 and conversion process 150.

Separating lithium extraction into two stages, with impurity removal between the two stages, allows the second lithium extractor 206 to serve also as a final stage of impurity removal. The intermediate stream 234 may have a low level of impurities that are not removed by the impurity removal unit 132, but the selectivity of the resin in the second lithium extractor 206 will result in very low levels of impurities, if any, being passed through to the clean stream 134. Use of two extraction stages 204 and 206 may also be more effective in preventing downstream transfer of impurities, since any impurities that pass through the first extraction stage 204 may be partially or completely removed by the second extraction stage 206. The capacity of the first lithium extractor 204 can also be lower since the total lithium uptake capacity needed is now split between the two extractors 204 and 206. Depending on the brine source used for the process 200, splitting lithium extraction into two stages, with impurity removal between the two stages, may lower the overall capital investment and operating cost needed to accomplish the lithium recovery.

The composition sensor 137 can be used similarly here by the controller 124, which can be configured to control the impurity removal unit 132 and distribute the lithium uptake load of the lithium extractors 204 and 206 to target or minimize the level of one or more impurities in the clean stream 134. The controller 124 can similarly control the concentrator 138 to accomplish any impurity removal that might be needed downstream of the second lithium extractor 206. In the process 200, impurities will mostly circulate between and among the lithium extractors 204 and 206, and the impurity removal unit 132 will remove them to the water recovery process 107 for return to the environment. If the composition sensor 137 detects changing impurity levels, the controller 124 can be configured to perform a hierarchy of control actions, including intensifying impurity removal at the impurity removal unit 132, for example by increasing addition of alkalinity to increase pH at the impurity removal unit 132, increasing flow of eluent 108 to reduce solution concentration of impurities entering the impurity removal unit 132, and intensifying permeation of the concentrator 138 to increase impurity removal into the recycled streams. Depending on the nature of the impurities detected by the composition sensor 137, the controller 124 may be further configured to control the pretreat unit 105 to increase or decrease intensity of impurity removal upstream of the first lithium extractor 204.

Figure 3:
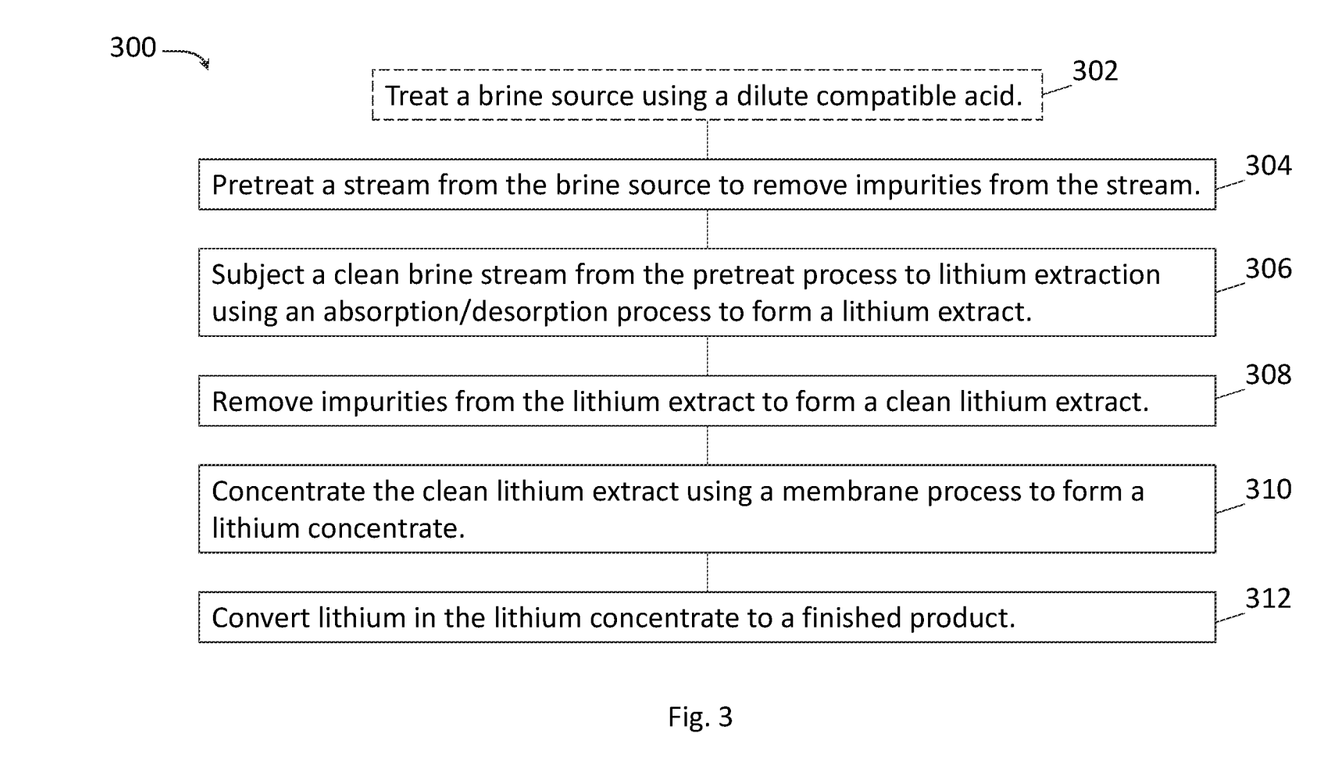
FIG. 3 is a flow diagram summarizing a method of lithium recovery according to one embodiment.

FIG. 3 is a flow diagram summarizing a method 300 of lithium recovery made possible by the processes 100 and 200. The method 300 recovers lithium from a brine source that contains lithium, along with metal impurities such as Fe, $SiO_2$, Ca, Mg, Mn, Al, and P, and solids such as salts and soil that might be entrained in the brine source. The method 300 includes, at 302, optionally treating the brine source itself with a dilute compatible acid, such as hydrochloric acid, acetic acid, or citric acid, to lower the pH of the brine source. The acid treat operation is shown in FIG. 3 with a dotted outline to identify it as an optional part of the method 300. Lowering the pH of the brine source, for example to a range of about 5.5 to about 7.0 as mentioned above, can increase concentration of lithium in the brine source by removing some impurities from solution. Inserting the acid treatment at a location of the brine source remote from intake to a lithium recovery process can increase lithium in solution toward the intake by encouraging dissolution of lithium away from the acid injection location.

At 304, a feed is taken from the brine source into a lithium recovery process. The feed is pretreated to remove some impurities prior to lithium recovery. The pretreatment includes a more intensive acid treatment than that optionally applied to the brine source itself. The acid treatment can lower the pH further, for example to a range of about 5.0 to about 6.5 or below, to remove essentially all iron from the brine source. The pretreatment may also include an ion exchange treatment to remove Si from the brine source. The impurities are collected in an impurity stream that can be routed to disposition, for example by purification and return to the environment.

At 306, the cleaned brine from the pretreatment is routed to a lithium extraction process. The lithium extraction process generally uses an sorption medium selective for lithium, which may be any of a number of resins known in the art, to absorb lithium from the cleaned brine. The medium, loaded with lithium, is then washed using an eluent that may be a water stream or a lithium containing stream to unload the lithium into the eluent, forming a lithium extract stream. After exposure to the sorption medium, the cleaned brine becomes a lithium-depleted brine. Water can be recovered from the lithium-depleted brine and used to reduce demand for fresh water in the process. The water recovery process produces a concentrated brine that can be routed to disposal, for example to purification for return to the environment.

The lithium sorption process may be batch, semi-batch, or continuous mode. In batch mode, a batch of absorbent is exposed to the clean brine and loaded with lithium. When the absorbent reaches an end point, exposure to the clean brine is discontinued, and exposure to the eluent stream is begun. The eluent stream removes lithium until a minimum point is reached, at which time exposure to the clean brine stream is resumed. In semi-batch mode, a first batch of absorbent is exposed to the clean brine stream while a second batch is exposed to the eluent stream. When the two batches of absorbent reach their end points, exposure is switched such that the first batch is then exposed to eluent while the second batch is exposed to the clean brine stream. Because the two exposures might take different lengths of time, there may be more batches of absorbent in sorption mode than in unloading mode, or vice versa. A controller can also vary cycle time to optimize modality of absorbent batches, for example by adjusting brine flow rate during loading and adjusting eluent flow rate, or eluent lithium content, during unloading. In continuous mode, sorption medium is continuously flowed through and into contact with clean brine until the medium is loaded. For example, the solid sorption medium may be transported in a vessel, cage structure, or on a moving platform or belt through an exposure chamber or vessel, or to a flow path for exposure to a continuously circulating clean brine stream, and when fully loaded, can then be transported into another chamber, vessel, or flow path for exposure to eluent.

The lithium extraction process may be performed in stages, where a first lithium extraction stage produces an intermediate lithium extract, which is routed to a second lithium extraction stage. In some cases, a third lithium extraction stage, or even more lithium extraction stages may be used. For each stage, the lithium-depleted stream can be routed to a prior stage as eluent. Water can be added to each eluent stream to target a salinity, or other compositional component. In this way, while lithium flows from stage to stage, at optionally increasing concentration, impurities that may be present are generally flowed "backwards" from downstream stages to upstream stages to be routed to disposal, for example returned to the environment. The stages can thus be considered "counter-current" when operated in this manner.

In the two-stage case where a first lithium extraction stage produces an intermediate lithium extract which is routed to a second lithium extraction stage, the first lithium extraction stage produces a first lithium-depleted stream while the second lithium extraction stage produces a second lithium-depleted stream. In one example, the second lithium-depleted stream is about 10% the volume of the brine feed to the first lithium extraction stage. In this case, the second lithium-depleted stream can be routed to the first lithium extraction stage as an eluent stream. Some of the impurities in the second lithium-depleted stream may transfer to the first lithium-depleted stream by sorption onto the medium in the first lithium extraction stage, or from brine not entirely flushed from the medium when switching from loading to unloading mode. To prevent impurities from building up in recycle between the first and second lithium extraction stages, a portion of the second lithium-depleted stream can be routed to water recovery 107 or to disposal. As noted above, in a two-stage extraction, the second lithium extraction stage can have lower capacity, and will use less eluent flow, than the first lithium extraction stage. In one example, eluent volume flow to the second lithium extraction stage is 5% of the brine feed volume to the first lithium extraction stage.

In all the lithium extraction processes described herein, transfer of impurities to effluent intermediate product streams can be improved by preceding lithium unloading with a flush, evacuation, or other removal of the fluid in which the sorption medium is immersed prior to flowing eluent across the sorption medium to unload lithium. In one example, the brine engaged with the medium can be displaced, using water or a lithium containing stream such as any of those described above that can be used as, or with, the eluent stream. The fluid used to displace the brine may be routed to disposal, or if the fluid contains some lithium removed from the absorbent, and is otherwise compatible with the lithium recovery process (as will be the case with most aqueous flush fluids), may be returned to the feed of a lithium extraction stage or process. In another example, a fluid that does not remove lithium from the absorbent, such as an oleaginous fluid, for example a hydrocarbon fluid or other organic fluid, can be used to displace the brine. The oleaginous fluid can then be displaced with eluent and lithium unloading can commence. In another example, a gas, for example an inert gas like nitrogen or a noble gas, can be used to displace the brine. The gas can then be displaced by eluent and lithium unloading can commence. These displacement processes can be automated under the control of a controller in communication with suitably placed control devices.

The lithium extract, or an intermediate lithium extract, is subjected to impurity removal at 308. While the sorption medium used in the lithium extraction process is selective to lithium, some impurities may still pass through to the lithium extract streams. Those impurities are removed, or substantially removed, in the impurity removal process. One aspect of the impurity removal process is removal of divalent metal ions such as Ca and Mg. Alkalinity is added to raise the pH of the stream, for example to about 8 or 9, which precipitates Ca and Mg ions as salts. The precipitates can be removed in a slurry stream, which can be returned to a more neutral pH (which re-dissolves the Ca and Mg) and purified for return to the environment. The impurity removal can be performed between lithium extraction stages for a multi-stage lithium extraction process. The impurity removal process results in a clean lithium extract. In other embodiments, an ion exchange process, using for example one of the IX ion exchange resins from DuPont de Nemours, Inc., of Wilmington, Delaware, can be used to remove divalent species. Such processes can avoid the need to precipitate the impurities for removal and then re-dissolve them for release to the environment.

At 310, the clean lithium extract is concentrated using a membrane process. Pressure and temperature of the clean lithium extract is brought to a target to facilitate maximum separation of water and lithium to increase solution concentration of lithium in the rejected stream. The permeate stream will contain some lithium and nearly all remaining impurities. This permeate stream can be used, potentially along with other streams like water and other lithium-containing streams, as eluent for lithium extraction stages and processes described above. The rejected stream is a clean lithium concentrate stream ready for finishing. Concentration using a membrane process can be useful here to remove water that otherwise would be removed by evaporation. At some concentration ranges, membrane separation is more energy-efficient than evaporation for removing water and concentrating lithium-containing streams.

At 312, the clean lithium concentrate stream is converted to lithium carbonate and/or lithium hydroxide. As described above, and according to known processes, sodium carbonate is added to the lithium concentrate stream to convert the lithium chloride in the lithium concentrate stream to lithium carbonate and sodium chloride, and calcium hydroxide converts the lithium carbonate to lithium hydroxide hydrate. Water may be evaporated as part of the conversion process, and the evaporated water can be captured for reuse elsewhere in the process, for example in the various eluent streams for lithium extraction. Use of water evaporated in the conversion process can reduce the need for fresh water from the water source. Heat can be recovered from the evaporated water and re-used in the evaporation process and/or for other purposes, such as freeze protection and temperature set point targeting throughout the process. Heat can also be recovered from any power generation that may be co-located with any of the lithium recovery processes described herein. Finally, recovered heat can be used to heat the brine source 102 and the eluent stream 108 for lithium extraction processing.

We claim:

1. A method of recovering lithium from an aqueous source, comprising:
    extracting lithium from the aqueous source using a sorption process followed by a desorption process to form a lithium extract, wherein the sorption process comprises adsorbing lithium ions from the aqueous source using a sorption medium to yield a first lithium-depleted brine and a lithium-loaded sorption medium, and the desorption process comprises contacting the lithium-loaded sorption medium with an eluent to form the lithium extract;
    recovering a first water stream from the first lithium-depleted brine using a filtration or membrane process;
    adding the first water stream to the eluent;
    concentrating the lithium extract using a water removal process to form a lithium concentrate and a second water stream;
    converting lithium in the lithium concentrate to form a product stream and one or more third water streams, wherein the product stream includes lithium carbonate, lithium hydroxide, or both; and
    recycling, to the eluent, a recycled stream comprising at least a portion of the lithium extract, the lithium concentrate, the first water stream, the second water stream, at least one of the third water streams, or a combination thereof, wherein the recycling includes controlling a composition of the recycled stream.

2. The method of claim 1, wherein the sorption process followed by the desorption process includes:
    a first sorption process followed by a first desorption process, the first desorption process yielding an intermediate lithium extract stream;
    removing impurities from the intermediate lithium extract stream to yield a clean intermediate lithium extract stream;
    after removing the impurities, performing a second sorption process using the clean intermediate lithium extract stream; and
    after performing the second sorption process, performing a second desorption process to yield the lithium extract.

3. The method of claim 2, wherein the second sorption process yields a second lithium-depleted brine that is used as an eluent in the first sorption process.

4. The method of claim 1, further comprising treating the aqueous source using a lithium-selective additive to remove impurities prior to performing the sorption process.

5. The method of claim 1, wherein the water removal process is operated to maximize solution concentration of lithium in the lithium concentrate.

6. The method of claim 1, wherein recovering water from the first lithium-depleted brine yields a concentrated brine stream that is returned to the aqueous source, and further comprising adding a lithium-selective additive to the concentrated brine stream prior to returning the concentrated brine stream to the aqueous source.

7. The method of claim 1, wherein converting the lithium in the lithium concentrate includes evaporating water using heat, and wherein the method further comprises including recovering waste heat from evaporating the water.

8. The method of claim 1, wherein controlling the composition of the recycled stream includes directing a combination of any of the lithium extract, the lithium concentrate, the first water stream, the second water stream, and at least one of the third water streams to the recycled stream using respective flow rates that are adjusted to control the composition of the recycled stream.

9. The method of claim 8, wherein the flow rate of each stream directed to the recycled stream is adjusted based on a composition of the respective stream.

10. The method of claim 1, further comprising sensing a composition of the lithium extract, the lithium concentrate, the first water stream, the second water stream, at least one of the third water streams, or a combination thereof directed to the recycled stream.

11. The method of claim 10, wherein sensing the composition uses a composition-related sensor, wherein the composition-related sensor includes a pH sensor, a conductivity sensor, a permittivity sensor, a specific gravity sensor, a turbidity sensor, an electrochemical sensor, a chromatograph, or an optical sensor.

12. The method of claim 1, wherein the composition of the recycled stream is controlled to a target composition for optimizing lithium unloading from the sorption medium.

\* \* \* \* \*